United States Patent
Sarcone et al.

(10) Patent No.: US 9,727,248 B2
(45) Date of Patent: Aug. 8, 2017

(54) DYNAMIC IO OPERATION TIMEOUT ASSIGNMENT FOR A SOLID STATE DRIVE

(71) Applicant: Apple Inc., Cupertino, CA (US)

(72) Inventors: Christopher J. Sarcone, Saratoga, CA (US); Manoj K. Radhakrishnan, Fremont, CA (US)

(73) Assignee: Apple Inc., Cupertino, CA (US)

( * ) Notice: Subject to any disclaimer, the term of this patent is extended or adjusted under 35 U.S.C. 154(b) by 421 days.

(21) Appl. No.: 14/173,709

(22) Filed: Feb. 5, 2014

(65) Prior Publication Data
US 2015/0220278 A1 Aug. 6, 2015

(51) Int. Cl.
*G06F 12/02* (2006.01)
*G06F 3/06* (2006.01)

(52) U.S. Cl.
CPC ............ *G06F 3/061* (2013.01); *G06F 3/0659* (2013.01); *G06F 3/0688* (2013.01); *G06F 12/0246* (2013.01); *G06F 2212/72* (2013.01)

(58) Field of Classification Search
CPC ................................ G06F 12/00–12/16; G06F 2212/72–2212/7211; G06F 3/0601–3/0608
See application file for complete search history.

(56) References Cited

U.S. PATENT DOCUMENTS

| | | | | |
|---|---|---|---|---|
| 2010/0211737 | A1* | 8/2010 | Flynn et al. | 711/114 |
| 2011/0010490 | A1* | 1/2011 | Kwon et al. | 711/103 |
| 2012/0066439 | A1* | 3/2012 | Fillingim | G06F 11/3485 711/103 |
| 2013/0086302 | A1* | 4/2013 | Tressler | G06F 3/0679 711/103 |

* cited by examiner

*Primary Examiner* — Nicholas Simonetti
(74) *Attorney, Agent, or Firm* — Downey Brand LLP (57) ABSTRACT

A storage system having an input-output (IO) component, a solid state drive (SSD) with multiple logical units (LUNs), e.g., flash storage units, and a controller coupled to the IO component and the SSD. The controller can cause the storage system to receive an operation request, determine various operational throughputs associated with outstanding commands of the SSD (e.g., read or write commands to be performed by the SSD), determine a time required for the SSD to process the outstanding commands based in part on the operational throughputs, and assign a timeout value to the received operation request. The timeout value may correspond to the time required for the SSD to process the outstanding commands. Any of the operational throughputs may be throttled when a die temperature of any of the SSD's LUNs exceeds an operating temperature threshold, or when an ambient temperature affecting SSD exceeds an ambient temperature threshold.

17 Claims, 6 Drawing Sheets

DYNAMIC IO OPERATION TIMEOUT ASSIGNMENT FOR A SOLID STATE DRIVE

FIELD

The described embodiments generally relate to non-overwrite storage systems, and more particularly, to procedures for dynamically assigning timeout values to input-output (IO) operations of a solid state drive (SSD).

BACKGROUND

Many modern electronic devices employ flash-based storage systems to improve storage throughput from overwrite-type storage systems of the past. Overwrite-type storage systems, such as hard disk drives (HDDs), were previously utilized more frequently in consumer electronic devices to minimize storage space requirements, e.g., by writing new data directly to previously-used storage blocks whose data was deemed to be obsolete, as opposed to only writing new data to free storage blocks. However, these predecessor storage systems have many intrinsic deficiencies that negatively impact storage system throughput for both read and write operations.

By way of example, some HDDs are only able to process roughly one hundred storage commands at a time; whereas, some flash-based storage systems, such as solid state drives (SSDs), can process a thousand or more storage commands at a time. SSDs and other flash-based storage systems provide device manufacturers with affordable, high-capacity storage options for integration within many of their consumer electronics products. Some consumer electronics products that can employ SSDs are personal computing devices, such as: desktop and laptop computers, mobile phones and smartphones, tablet computers, media player devices, electronic book devices, mobile hotspot devices, cameras, video recording devices, gaming units, or the like.

When a device's storage system receives an input-output (IO) request from an application running at the device, e.g., to read application data from an SSD or to write application data to an SSD, an operating system (OS) level device driver may assign a default timeout value to the corresponding IO request. The default timeout value is intended to allow the storage system sufficient time to process the corresponding IO command. Unfortunately, default timeout values assigned to IO requests by OS-level device drivers can be overly-conservative, particularly in the presence of various storage system throttling scenarios.

For instance, an SSD may be throttled in response to detecting an increase in die temperature of one or more logic units (LUNs), e.g., flash storage units, of the SSD, or in response to detecting an ambient temperature increase at the SSD, resulting from a nearby processor radiating heat, e.g., during computation-intensive processing operations. By throttling the SSD, and applying overly-conservative IO operation timeout values to incoming IO requests, the number of commands that an SSD may be able to process at a particular time can be significantly diminished. In some situations, this detrimental occurrence may result in an SSD's storage throughput being even slower than that of its HDD counterparts.

Moreover, excessive IO operation timeout delays can cause a command processing image (e.g., the image of a spinning beach ball for certain Apple® Mac OS systems) to appear on the display of a computing device for an extended period of time, e.g., for 20 seconds or longer. In response to being presented with this command processing image for an extended period of time, a user may elect to restart their computing device in an attempt to correct a presumed problem with their device. This is a detrimental result, because, in many scenarios, the command processing associated with the command processing image may have finished shortly after the time when the user elected to restart the computing device.

Accordingly, there exists a need for a solution that more appropriately sets IO operation timeout values for incoming IO requests of a SSD storage system during various storage system throttling scenarios, in lieu of simply assigning default, overly-conservative timeout values to various IO operations.

SUMMARY

This disclosure describes apparatus and methods for managing a solid state drive (SSD) of a storage system. In some embodiments, a method for managing the SSD includes, receiving an operation request for the SSD (e.g., via an input-output component of the storage system), identifying a number of outstanding commands of the SSD (e.g., commands yet to be performed by the SSD), determining one or more operational throughputs associated with the outstanding commands, determining a time required for the SSD to process the outstanding commands based at least in part on the number of outstanding commands of the SSD and the one or more operational throughputs, and assigning a timeout value to the received operation request. In some implementations, the timeout value may correspond to the time required for the SSD to process the outstanding commands.

In accordance with one aspect of the disclosure, the received operation request can be an input-output (IO) request for writing application data to the SSD, an IO request for reading application data from the SSD, or both.

In accordance with another aspect of the disclosure, the method may further involve issuing at least one command associated with the received operation request to the SSD, monitoring a time duration for the SSD to process the at least one command, and then reissuing the at least one command to the SSD when the time duration is determined to exceed the timeout value.

In yet another aspect of the disclosure, the identified number of outstanding commands of the SSD may be associated with a number of outstanding read commands to be performed by the SSD and/or a number of outstanding write commands to be performed by the SSD.

In some implementations, the one or more operational throughputs may correspond to a first SSD throughput for performing at least one read command of the one or more outstanding commands and/or a second SSD throughput for performing at least one write command of the one or more outstanding commands.

In accordance with an aspect of the disclosure, the first SSD throughput can be a maximum read throughput rate at which data is read from the SSD or a minimum read throughput rate at which data is read from the SSD under a throttled throughput condition, and the second SSD throughput can be a maximum write throughput rate at which data is written to the SSD or a minimum write throughput rate at which data is written to the SSD under the throttled throughput condition.

In accordance with another aspect of the disclosure, the first SSD throughput or the second SSD throughput may be associated with a throttled throughput rate that is throttled based at least in part on a die temperature of one or more logical units (LUNs), e.g., flash storage units, of the SSD exceeding an operating temperature threshold of the SSD and/or an ambient temperature that affects the one or more LUNs of the SSD exceeding an ambient temperature threshold of the SSD.

In some implementations, determining the one or more operational throughputs associated with the outstanding commands may involve receiving a throttling feedback from the SSD, wherein the throttling feedback may be associated with an actual read throughput rate of the SSD or an actual write throughput rate of the SSD, and then determining the one or more operational throughputs based in part on the received throttling feedback.

In one aspect of the disclosure, determining the time required for the SSD to process the outstanding commands may further include, dividing a data requirement of a first portion of the outstanding commands by a first operational throughput value to obtain a first result, dividing a data requirement of a second portion of the outstanding commands by a second operational throughput value to obtain a second result, summing the first result and the second result to obtain a third result, and multiplying the third result by a number of LUN dies of the SSD to determine the time required for the SSD to process the outstanding commands.

In some aspects, a method of assigning operational timeout values for a SSD, can include receiving an operation request for the SSD, receiving a throttling feedback from the SSD, where the throttling feedback indicates a current read throughput rate of the SSD or a current write throughput rate of the SSD, determining a time required for the SSD to process one or more outstanding commands (e.g., read or write commands yet to be performed by the SSD) based at least in part on the throttling feedback received from the SSD, and then assigning a timeout value to the received operation request. In some implementations, the timeout value may correspond to the time required for the SSD to process the one or more outstanding commands.

In one aspect of the disclosure, the current read throughput rate and/or the current write throughput rate may correspond to a throttled throughput rate that is throttled based at least in part on a die temperature of one or more LUNs, e.g., flash storage units, of the SSD exceeding an operating temperature threshold of the SSD and/or an ambient temperature that affects the one or more LUNs of the SSD exceeding an ambient temperature threshold of the SSD.

In accordance with another aspect of the disclosure, is a storage system having an IO component, an SSD with multiple LUNs, e.g., flash storage units, and a controller coupled to the IO component and the SSD. The controller can be configured to cause the storage system to receive an operation request, determine various operational throughputs associated with outstanding commands of the SSD (e.g., read or write commands yet to be performed by the SSD), determine a time required for the SSD to process the outstanding commands based in part on the operational throughputs, and assign a timeout value to the received operation request. In accordance with one aspect. In some implementations, the timeout value may correspond to the time required for the SSD to process the outstanding commands.

In accordance with some aspects of the disclosure, one or more of the operational throughputs may be independently throttled when a die temperature of any of the SSD's LUNs exceeds an operating temperature threshold and/or when an ambient temperature affecting SSD exceeds an ambient temperature threshold.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

DETAILED DESCRIPTION

Representative examples for managing a storage system having a solid state drive (SSD) are described within this section. In some implementations, the storage system can dynamically set timeout values for one or more received input-output (IO) requests based on a time required for an SSD to process various outstanding IO commands and/or based on throttling feedback received from the SSD. The storage system may also be configured to assign IO operation timeout values in an effort to reduce IO command processing latency, and to thereby improve storage throughput for the storage system. This disclosure describes example storage systems that are capable of achieving these objectives, as well as various other advantages, described further herein.

The provided examples are intended to add context to, and to aid in the understanding of, the cumulative subject matter of the disclosure. However, it should be apparent that the embodiments discussed in this disclosure may be practiced with or without some of the specific details described herein. Further, various modifications and/or alterations can be made to the subject matter described herein, and illustrated in the corresponding figures, to achieve similar advantages and results, without departing from the spirit and scope of the disclosure. Further, references are made in this section to the accompanying drawings, which form a part of the disclosure and in which are shown, by way of illustration, various implementations corresponding to the described embodiments herein. Although the embodiments of this disclosure are described and depicted in sufficient detail to enable one having ordinary skill in the art to practice the described subject matter, it should be understood that these examples are not to be construed as being overly-limiting or all-inclusive.

Figure 1:
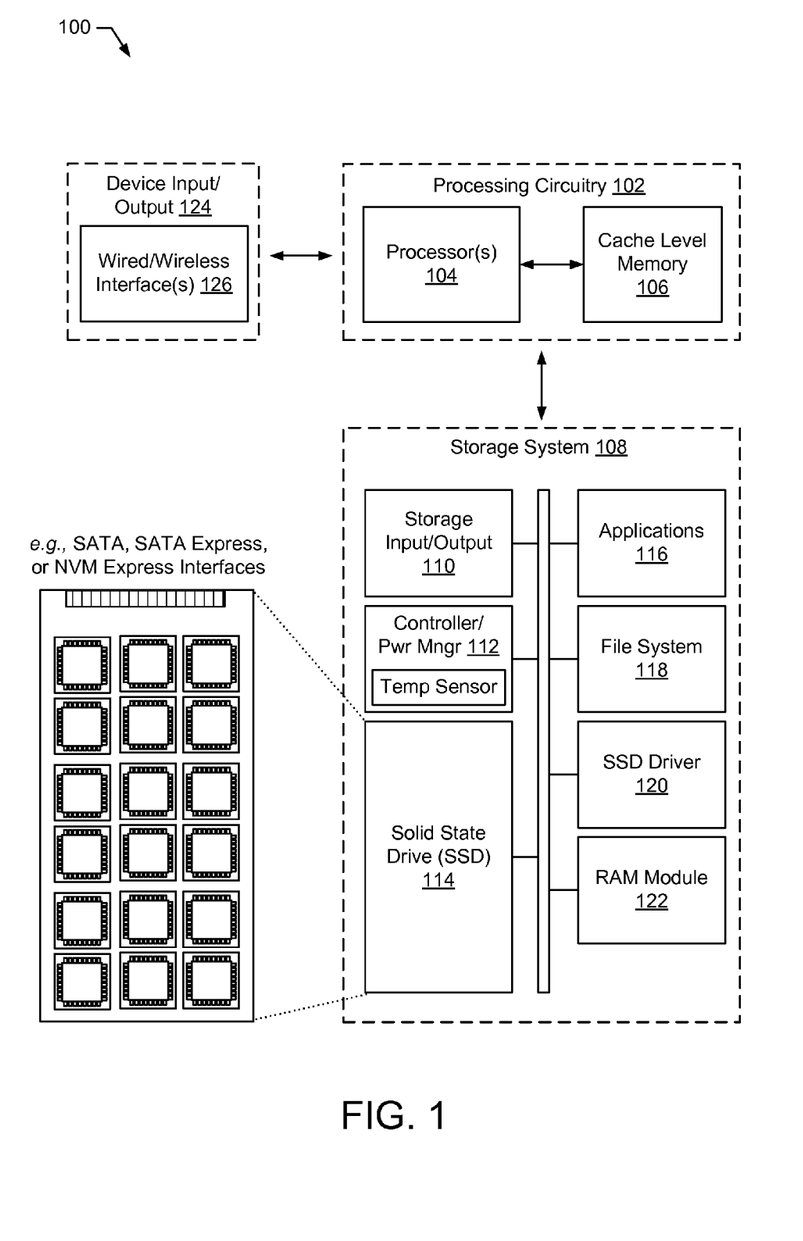
FIG. 1 shows a block diagram depicting a computing device with a storage system having a controller, solid state drive (SSD), and an SSD driver, in accordance with some embodiments of the disclosure.

FIG. 1 shows a block diagram depicting a computing device 100, which can correspond to a personal computing device, such as a desktop or laptop computer, a mobile phone or smartphone, a tablet computer, a media player device, an electronic book device, a mobile hotspot device, a digital camera, a video recording device, a portable gaming device or a consumer premises gaming console, etc., having an embedded or add-on SSD storage system 108 coupled thereto. In some embodiments, the computing device 100 may include processing circuitry 102 with one or more processor(s) 104 and a cache-level memory 106, a device IO component 124 with one or more wired and/or wireless interface(s) 126, and a storage system 108 having a storage IO component 110, a controller 112, an SSD 114, one or more application(s) 116, a file system 118, an SSD driver 120, and a random access memory (RAM) module 122, in accordance with some embodiments of the disclosure.

In some implementations, the storage IO component 110 may include a host-side interface (e.g., an interface between the storage system 108 and the computing device 100) and/or an SSD-side interface (e.g., an interface between the storage system 108 and the SSD 114). In an embodiment, either the host-side interface or the SSD-side interface of the IO storage component 110 can be associated with any one of, or any combination of, the following: a serial advanced technology attachment (SATA) interface, a SATA express (SATAe) interface, a non-volatile memory express (NVMe) interface, a peripheral component interconnect express (PCIe) interface, an advanced host controller interface (AHCI), etc. In some configurations, the SSD 114 may be composed of individual units (also referred to herein as "logical units" or "LUNs") having multiple dies per LUN, which can correspond to individual NAND-based flash storage elements.

In various operational scenarios, the larger the number of active dies of the SSD 114, the higher the storage throughput (e.g., the read throughput and/or the write throughput) will be for the SSD 114, and the more power will be consumed by the SSD 114. However, the power consumption of the SSD 114 is proportional to the thermal energy output by the individual dies of the SSD 114. Accordingly, the more power that is being consumed by the active dies of the SSD 114, the greater the operating temperature of the SSD 114 will be. As will be described further herein, when the operating temperature of one or more dies of the SSD 114 exceeds an operating temperature threshold of the SSD 114, the storage throughput of the SSD 114 may be throttled accordingly, based on the actual temperatures experienced by individual dies or LUNs of the SSD 114.

In another scenario, an ambient temperature experienced by any of the dies or LUNs of the SSD 114 may also be affected by a thermal energy output of one or more neighboring or co-located hardware element(s) of the computing device 100, such as the processor(s) 104 of the processing circuitry 102. In some implementations any of the processor(s) 104 of the processing circuitry 102 can correspond to a central processing unit (CPU) or a graphics processing unit (GPU) that is performing computation-intensive processing or image-rendering operations, resulting in a high thermal output. In various embodiments, when the ambient temperature experienced by any of the dies or LUNs of the SSD 114 exceeds an ambient temperature threshold of the SSD 114, the storage throughput of the SSD 114 may be throttled accordingly.

When the SSD 114 is throttled, e.g., due to the SSD 114 experiencing high operating temperatures or high ambient temperatures, the power being supplied to the SSD 114 may be lowered by the controller 112, and the number of active dies at the SSD 114 will typically be reduced. This can result in the read throughput of the SSD 114 and/or the write throughput of the SSD 114 being reduced at a particular point in time. In various embodiments, the storage system 108 controller 112 may be configured with a power management component having a temperature sensor. The power management component of the controller 112 may be able dynamically adjust the amount of power being supplied to or consumed by the SSD 114. This power/throughput throttling may occur when the power management component detects high operational or ambient temperatures at the SSD, by employing its temperature sensor(s).

In various embodiments, one or more applications 116 of the storage system 108 may be running at the computing device 100 at a particular point in time. It should be understood that in some implementations, any of the applications 116 may be stored within the SSD 114, or in any other storage component of the storage system 108 without departing from the spirit and scope of the disclosure. As a result of the application execution(s), numerous IO requests can be made of the SSD 114 via the file system 118 at the same time (e.g., on the order of hundreds or thousands of simultaneous IO requests). In various embodiments, the file system 118 can be employed to map to various storage system resources of the SSD 114, e.g., using the controller 112 and/or the SSD driver 120. Further, the RAM module 122 of the storage system 108 may act as a temporary cache storage area for the SSD 114, e.g., storing virtual block address information, mapping tables, etc., for the SSD 114.

In some configurations, the processing circuitry 102 of the computing device 100 can be configured to collaborate with (e.g., execute instructions of) one or more components of the storage system 108 (e.g., the controller 112, the SSD driver 120, the file system 118, and/or the SSD 114) to dynamically set timeout values for one or more received input-output (IO) requests based on a time required for an SSD 114 to process various outstanding IO commands and/or based on throttling feedback received from the SSD 114. These procedures can be implemented to reduce IO command processing latency and improve storage throughput for the storage system 108, e.g., in the manner described further herein with respect to FIGS. 3a-5.

In this regard, the processing circuitry 102 can be configured to control performance of one or more functionalities of the computing device 100, and thus, can provide functionality for performing various storage system 108 management procedures, in accordance with various embodiments. The processing circuitry 102 may further be configured to perform data processing, application execution, and other control and management functions of the computing device 100, according to one or more embodiments of the disclosure. Further, the processing circuitry 102 and/or the controller 112 of the storage system 108, or portions or components thereof, may respectively include one or more chipsets, which can be configured with any number of coupled microchips thereon. In this regard, the processing circuitry 102 and/or the controller 112 may be configured to employ their corresponding chipsets and/or microchips to separately or collaboratively implement functions associated with the management and control of various storage resources of the storage system 108, as describe further herein.

In various implementations, the processor(s) 104 of the processing circuitry 102, as well as processors of the controller 112, may be configured and/or employed in a variety of different forms. For example, these processor(s) 104 may be associated with any number of microprocessors, co-processors, controllers, or various other computing or processing implements, including integrated circuits such as, for example, an application specific integrated circuit (ASIC), a field programmable gate array (FPGA), or any combination thereof. In certain scenarios, multiple processors can be coupled to and/or configured in operative communication with each other, and these components may be collectively configured to perform one or more storage procedures for the SSD 114, utilizing the controller 112, the file system 118, the SSD driver 120, etc., as described further herein.

In some embodiments, the processor(s) 104 of the processing circuitry 102, as well as processors of the controller 112, can be configured to execute instructions that may be stored in the SSD 114, the RAM module 122, or some other storage device of, or otherwise coupled to, the storage system 108. As such, whether configured as, or in conjunction with, hardware or a combination of hardware and software, the processors 104 of the processing circuitry 102, as well as processors of the controller 112, may be independently or collaboratively capable of performing operations according to various implementations described herein, when configured accordingly.

It should be appreciated that not all of the components, device elements, and hardware illustrated in, and described with respect to, the computing device 100 shown in FIG. 1 may be essential to this disclosure, and thus, some of these items may be omitted, consolidated, or otherwise modified within reason without departing form the spirit and scope of the disclosure. In some implementations, the subject matter associated with the computing device 100 and/or the storage system 108 can be configured to include additional or substitute components, elements, or other hardware, beyond that which is depicted in FIG. 1. Additionally, within the present disclosure, the term "IO request" can be more generally referred to as an "operation request." However, an operation request, as described further herein, is not to be construed as being limited to an IO request, as an operation request may refer to a processing request that does not necessarily emanate from a storage IO component 110 of a storage system 108 (e.g., an operation request that originates from within the storage system 108).

Figure 2:
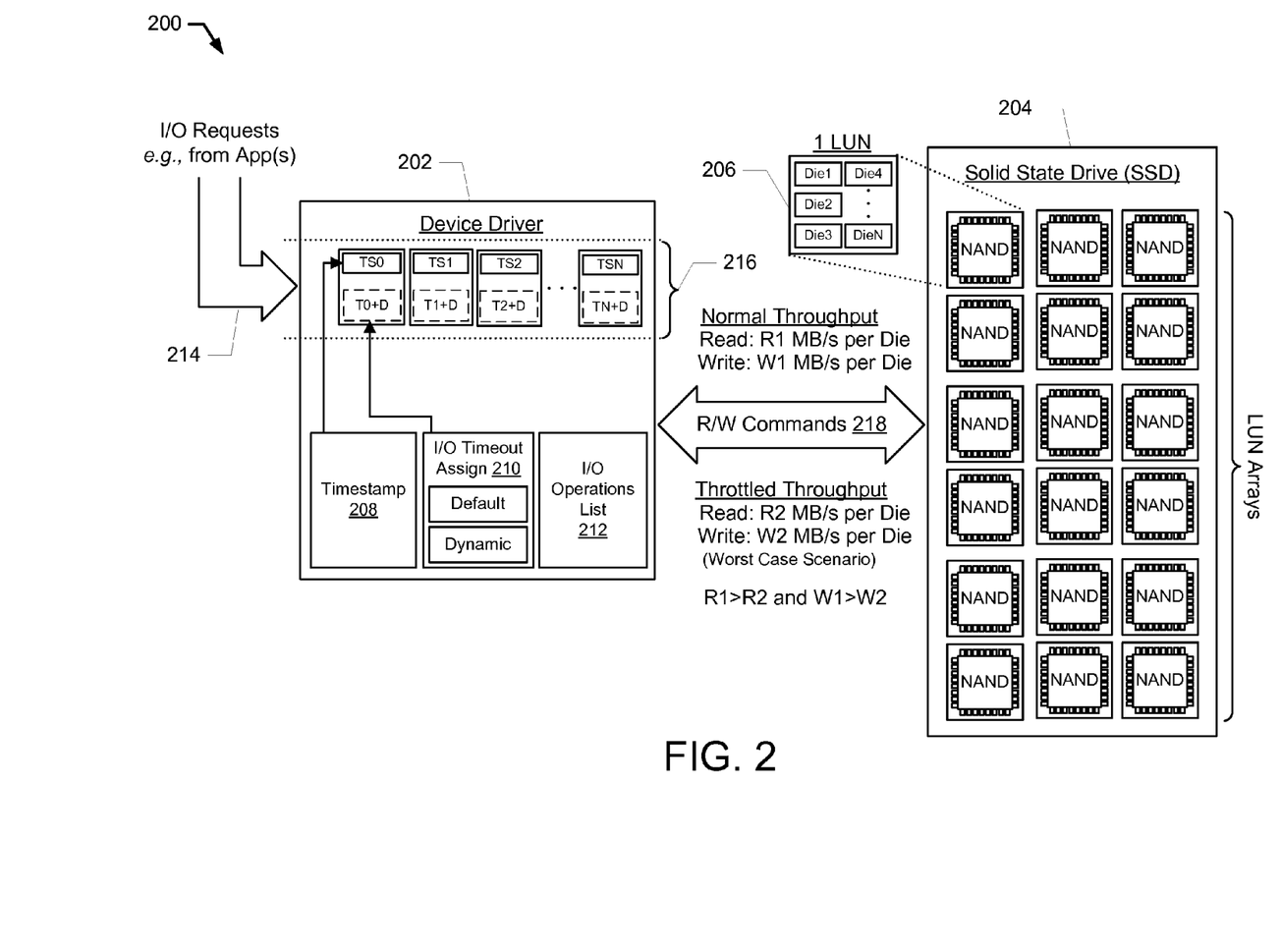
FIG. 2 shows an operational block diagram depicting a device driver of a storage system that is configured to assign input-output (IO) timeout values to received IO requests, in accordance with various embodiments of the disclosure.

FIG. 2 shows an operational block diagram 200 depicting a device driver 202 (e.g., the SSD driver 120 of FIG. 1) of a storage system (e.g., storage system 108) having SSD 204, which is configured to assign various IO timeout values to received IO requests 214, in accordance with various embodiments of the disclosure. It should be understood that, in various configurations, the device driver 202 can be configured to perform various storage procedures that are described further herein, independently, or in collaboration with a storage system controller (e.g., with controller 112). However, for the sake of clarity, the following storage system procedures are described with respect to the device driver 202 alone, with reference to the individual components of the device driver 202 (e.g., these components may be distributed within different components of the storage system, in varying implementations).

In some embodiments, the device driver 202 can include a timestamp component 208, an IO timeout assignment component 210, and an IO operations list 212 component. The IO operations list 212 may be stored in the RAM module 122 of the storage system 108 and IO operations list 212 can be configured to temporarily store any number of IO commands that are in queue (e.g., commands that are awaiting transfer to the SSD 204), as well as any number of outstanding IO commands (e.g., commands that have been transferred to the SSD 204, but not have not yet been processed by the SSD 204). The timestamp component 208 can sequentially stamp incoming IO requests 214 (e.g., IO requests that emanate from one or more applications 116 running at a computing device 100) with a time indication that identifies a particular time when a corresponding IO request is received by the device driver 202. In this manner, a timestamp chronology for received IO requests can be maintained and tracked by the device driver 202, e.g., within the IO operations list 212. As such, the device driver 202 can be configured to sequentially issue IO commands (corresponding to received IO requests) to the SSD 204 in accordance with a first-in-first-out (FIFO) implementation.

The IO timeout assignment component 210 can be configured to assign timeout (expiration) values to the sequentially time-stamped IO requests 214. For example, in various embodiments, the IO timeout assignment component 210 can apply a default timeout value D (e.g., a default timeout value of 5 sec.) to a first time-stamped IO request (corresponding to a first timestamp indication TS0), such that D seconds after the timestamp value TS0, a first IO command corresponding to the first time-stamped IO request will expire. If the first IO command has yet to be processed by the SSD 204 and the default timeout value expires, a duplicate IO command may be sent by the device driver 202 to the SSD 204 at a later time.

In some scenarios, the default timeout value may be associated with a best case scenario (an optimistic scenario, without throttling), when read and write throughputs of the SSD 204 are presumed to be operating at maximum data storage rates (e.g., when a read throughput is assumed to be operating at R1=80 megabytes per second (MB/s), per die of the SSD 204, and/or when a write throughput is assumed to be operating at W1=20 MB/s, per die of the SSD 204). In other scenarios, the default timeout value may be associated with a worst case scenario (a pessimistic scenario, with high throttling), when read and write throughputs of the SSD 204 are presumed to be operating at minimum data storage rates (e.g., when a read throughput is assumed to be operating at R2=20 MB/s, per die of the SSD 204, and/or when a write throughput is assumed to be operating at W2=5 MB/s, per die of the SSD 204). It should be understood that, in some embodiments, R1 can be substantially greater than R2, and W1 may be substantially greater than W2.

In other implementations, the IO timeout assignment component 210 may apply a dynamic (calculated) timeout value to a time-stamped IO request, based on a time required for an SSD 204 to process one or more outstanding IO commands in the IO operations list 212 and/or based on various throttling feedback received from the SSD 114, which may indicate a level of throttling currently being applied at the SSD 114. These dynamic IO time-stamping embodiments will be described further herein for FIGS. 3a-b.

In some configurations, the SSD 204 may include multiple arrays of LUNs, e.g., NAND-based flash storage units, which can respectively comprise multiple dies per LUN 206 of the SSD 204. In various embodiments, the device driver 202 may be configured to issue any number of IO commands 218 (e.g., IO commands stored in the IO operations list 212) to the SSD 204 in accordance with a FIFO implementation, such that a command associated with an oldest time-stamped IO request (e.g., an IO request stamped with timestamp T0) will be issued to the SSD 204 ahead of IO commands associated with newer time-stamped IO requests (e.g., IO requests stamped with timestamps T1 through TN).

In some implementations, the host-side interface and/or the SSD-side interface of the storage IO component 110 may enable the device driver 202 to issue multiple IO commands to the SSD 204 at the same time, in a serial or parallel transmission(s). As such, the storage throughput for the SSD 204 can also be dictated by the ability of the device driver 202 to issue various quantities of IO commands to SSD 204, in a time-varying manner. However, a bottleneck of IO commands being issued to the SSD 204 may more often be attributed to throttling mechanisms that are employed by the device driver 202 and/or an associated controller 112. In some implementations, the device driver 202 and/or a controller 112 may be associated with, or include, a system management controller (SMC) that can be configured to throttle the SSD 204 by increasing or lowering power flow (i.e., current flow) to one or more LUN dies 206 of the SSD 204.

Figure 3A:
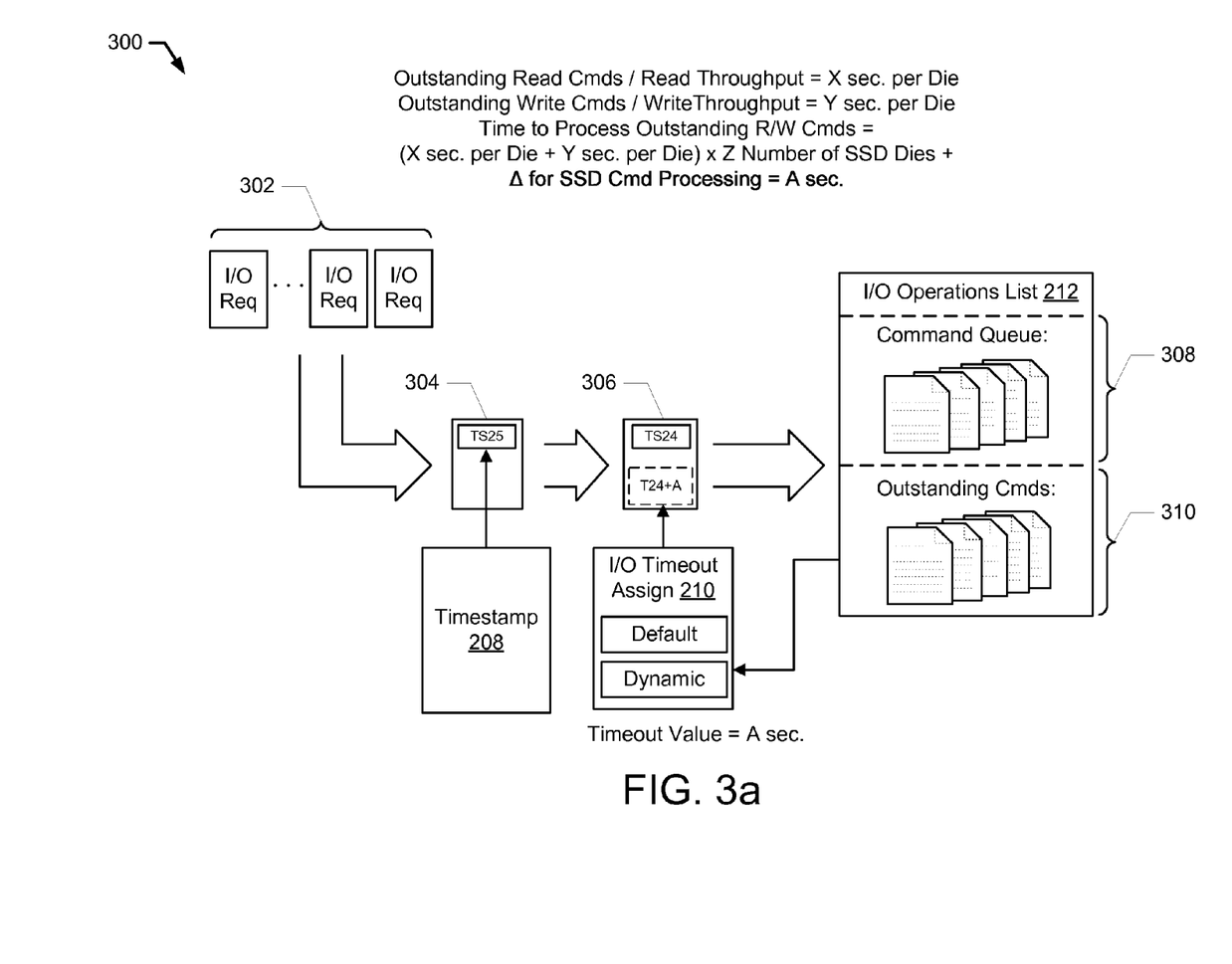
FIG. 3a shows an operational block diagram depicting a procedure for assigning IO timeout values to received IO requests, based on a time required for an SSD to process outstanding IO commands, in accordance with some implementations of the disclosure.

FIG. 3a shows an operational block diagram 300 depicting a process for assigning IO timeout values to received IO requests 302, based on a time required for an SSD 204 to process outstanding IO commands 310, in accordance with some implementations. With reference to any of the procedures depicted in FIG. 3a, it should be understood that in some configurations, the device driver 202 may be configured to perform various storage system procedures independently, or in collaboration with a storage system controller (e.g., with controller 112), without departing from the spirit and scope of the disclosure.

Initially, various incoming IO requests 302 may be received for an SSD 204 by a device driver 202. Subsequently, the timestamp component 208 of the device driver 202 may sequentially stamp 304 each incoming IO request 302 with a time indication (e.g., with time indication TS25) that identifies a particular time when a corresponding IO request 302 is received by the device driver 202. As such, a timestamp chronology for received IO requests 302 may be maintained within a command queue region 308 of the IO operations list 212. This can allow the device driver 202 to sequentially issue IO commands (corresponding to received IO requests 302) to the SSD 204 in accordance with a FIFO implementation.

In some embodiments, the IO timeout assignment component 210 can be configured to dynamically assign timeout (expiration) values to sequentially time-stamped IO requests 306, based on a time required for the SSD 204 to process one or more outstanding IO commands stored in an outstanding commands region 310 of the IO operations list 212. For example, in various embodiments, the IO timeout assignment component 210 can identify a number of outstanding read commands and a number of outstanding write commands that have already been issued to the SSD 204. These outstanding IO command types can be identified as they are stored within the outstanding commands region 310 of the IO operations list 212.

In some configurations, optimistic read and write throughputs (e.g., a best case scenario, assuming no throttling) can be utilized to calculate a time required for the SSD 204 to process all of the outstanding commands 310. In other configurations, pessimistic read and write throughputs (e.g., a worst case scenario, assuming no throttling) can be utilized to calculate a time required for the SSD 204 to process all of the outstanding commands 310. Alternatively, some other intermediate read and write throughputs may be utilized to calculate a time required for the SSD 204 to process the outstanding commands 310.

An equation for determining the time required for the SSD 204 to process the outstanding commands (which is used as the IO request/command timeout value), could be as recited in Equation 1, below:

$$TV = Z_{Dies} \times \left( \frac{ORC}{R_{Th}} + \frac{OWC}{W_{Th}} \right) + \Delta, \quad \text{(Eq. 1)}$$

where:
 TV=the timeout value to be assigned to an IO request (sec.);
 $Z_{Dies}$=the number of dies present in the SSD;
 ORC=the number of outstanding read commands of the SSD;
 OWC=the number of outstanding write commands of the SSD;
 $R_{Th}$=the assumed read throughput for the SSD (MB/s per die);
 $W_{Th}$=the assumed write throughput for the SSD (MB/s per die); and
 $\Delta$=the time allotted SSD command processing (sec.).

As an example, assuming worst-case throughput in a fully throttled condition, these are some values that can be expected. If ORC=10 and the maximum IO size is 1 MB, then there are 10 MB of read requests outstanding. If OWC=4 and the maximum IO size is 1 MB, then there are 4 MB of write requests outstanding. If reads go at 20 MB/s per die and writes at 5 MB/s per die in highest throttling conditions, then the worst case timeout value would be:

(10/20+4/5)+Δ=1.3 seconds+some time allotted for
 SSD command processing=~2 seconds After the IO timeout assignment component 210 calculates the time required for the SSD 204 to process the outstanding commands 310, and thus determines the timeout value for a particular IO request, the IO timeout assignment component 210 can assign the timeout value, e.g., timeout value A, to the corresponding IO command. In accordance with some embodiments, when a particular IO command has yet to be processed by the SSD 204, and the IO command's corresponding timeout value expires, a duplicate IO command may be issued by the device driver 202 to the SSD 204 at a later time to ensure that the SSD 204 processes the IO command.

Figure 3B:
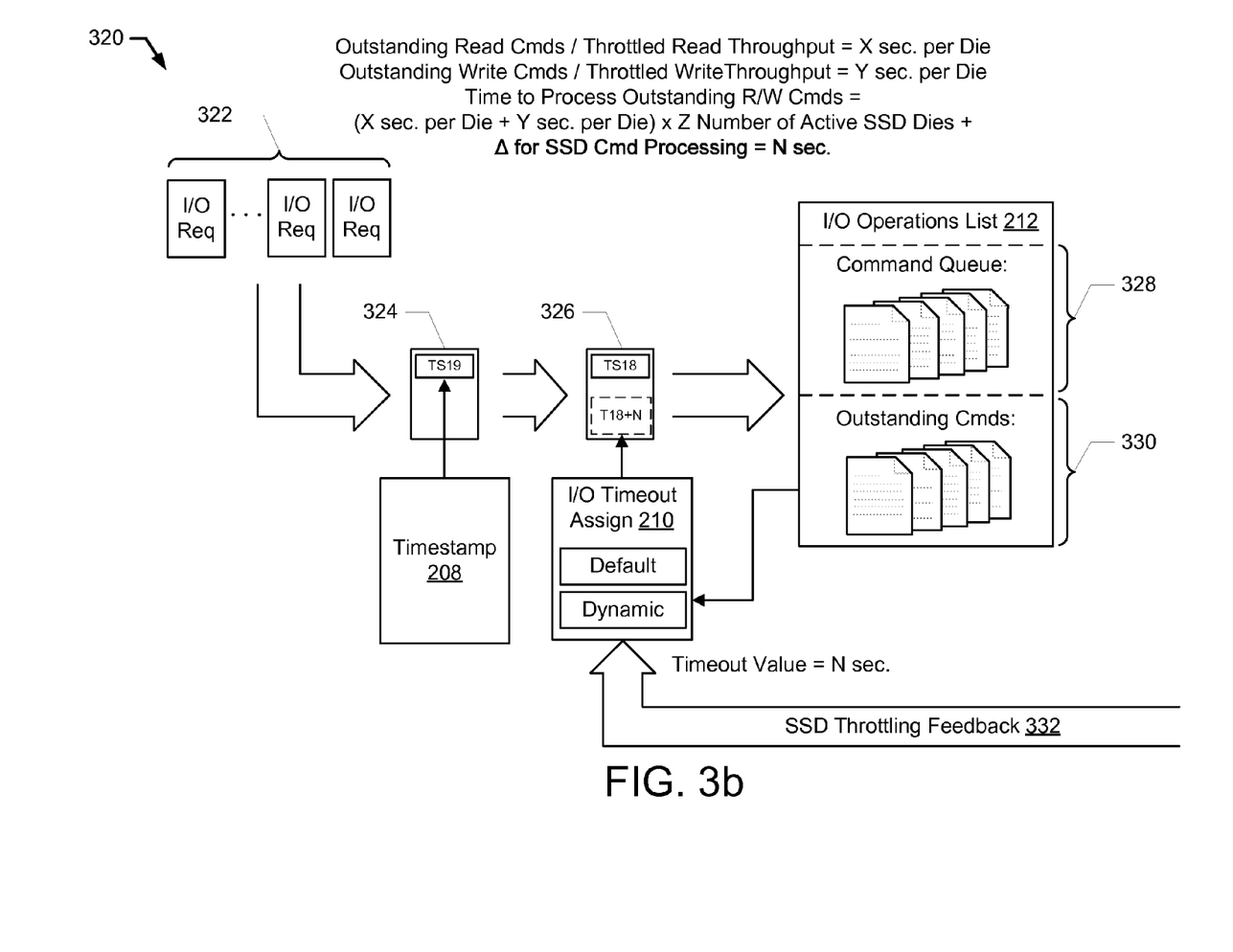
FIG. 3b shows an operational block diagram depicting a procedure for assigning IO timeout values to received IO requests, based on throttling feedback information received from an SSD, in accordance with various embodiments.

FIG. 3b shows an operational block diagram 320 depicting a process for assigning IO timeout values to received IO requests 322, based on throttling feedback information 332 received from an SSD 204, in accordance with various embodiments. With reference to any of the procedures depicted in FIG. 3b, it should be understood that in certain implementations, the device driver 202 may be configured to perform various storage system procedures independently, or in collaboration with a storage system controller (e.g., with controller 112), without departing from the spirit and scope of the disclosure.

Similar to FIG. 3a, initially, multiple incoming IO requests 322 may be received for an SSD 204 by a device driver 202. Subsequently, the timestamp component 208 of the device driver 202 may sequentially stamp 304 each incoming IO request 322 with a time indication (e.g., with time indication TS19) that identifies a particular time when a corresponding IO request 322 is received by the device driver 202. As such, a timestamp chronology for received IO requests 322 may be maintained within a command queue region 328 of the IO operations list 212. This can allow the device driver 202 to sequentially issue IO commands (corresponding to received IO requests 322) to the SSD 204 in accordance with a FIFO implementation.

In some implementations, the IO timeout assignment component 210 can be configured to dynamically assign timeout (expiration) values to sequentially time-stamped IO requests 322, based on a time required for the SSD 204 to process one or more outstanding IO commands stored in an outstanding commands region 330 of the IO operations list 212, and based on throttling feedback 332 received from the SSD 204. In various implementations, this throttling feedback 332 may indicate a current number of active dies 206 of the SSD 204, as well as, an actual read throughput rate and an actual write throughput rate experienced by the SSD 204 at its current throttling level. Alternatively, the actual read throughput rate and the actual write throughput rate experienced by the SSD 204 may be derived by the IO timeout assignment component 210 of the device driver 202, using the information indicating a current number of active dies 206 of the SSD 204, a power consumption of the SSD 204, etc.

In some embodiments, the IO timeout assignment component 210 may be configured to identify a number of outstanding read commands and a number of outstanding write commands that have already been issued to the SSD 204. These outstanding IO command types can be identified as they are stored within the outstanding commands region 330 of the IO operations list 212. Subsequently, the actual (e.g., throttled) read and write throughputs can be utilized to calculate a time required for the SSD 204 to process all of the outstanding commands 330.

Another equation for determining the time required for the SSD 204 to process the outstanding commands (which is used as the IO request/command timeout value), may be as recited in Equation 2, below:

$$TV = Z_{Dies}^{active} \times \left( \frac{ORC}{R_{Th}^{actual}} + \frac{OWC}{W_{Th}^{actual}} \right) + \Delta, \quad \text{(Eq. 2)}$$

where:
TV=the timeout value to be assigned to an IO request (sec.);
$Z_{Dies}^{active}$=the number of active dies of the SSD;
ORC=the number of outstanding read commands of the SSD;
OWC=the number of outstanding write commands of the SSD;
$R_{Th}^{actual}$=the actual read throughput for the SSD (MB/s per die);
$W_{Th}^{actual}$=the actual write throughput for the SSD (MB/s per die); and
Δ=the time allotted SSD command processing (sec.).
As for some example values, it would simply depend on the throttle level and how it affects the R2/W2 values.

As described above, in various SSD throttling scenarios, the actual read and write throughputs of the SSD 204 may be lowered by some finite amount, in response to one or more dies or LUNs of the SSD 204 experiencing higher than normal operating temperatures or higher than normal ambient temperatures. After the IO timeout assignment component 210 calculates the time required for the SSD 204 to process the outstanding commands 330, and thus determines the timeout value for a particular IO request 322, the IO timeout assignment component 210 can assign the timeout value, e.g., timeout value N, to the corresponding IO command. In accordance with various implementations, when a particular IO command has yet to be processed by the SSD 204 and the IO command's corresponding timeout value expires, a duplicate IO command may be issued by the device driver 202 to the SSD 204 at a later time to ensure that the SSD 204 processes the IO command.

Figure 4:
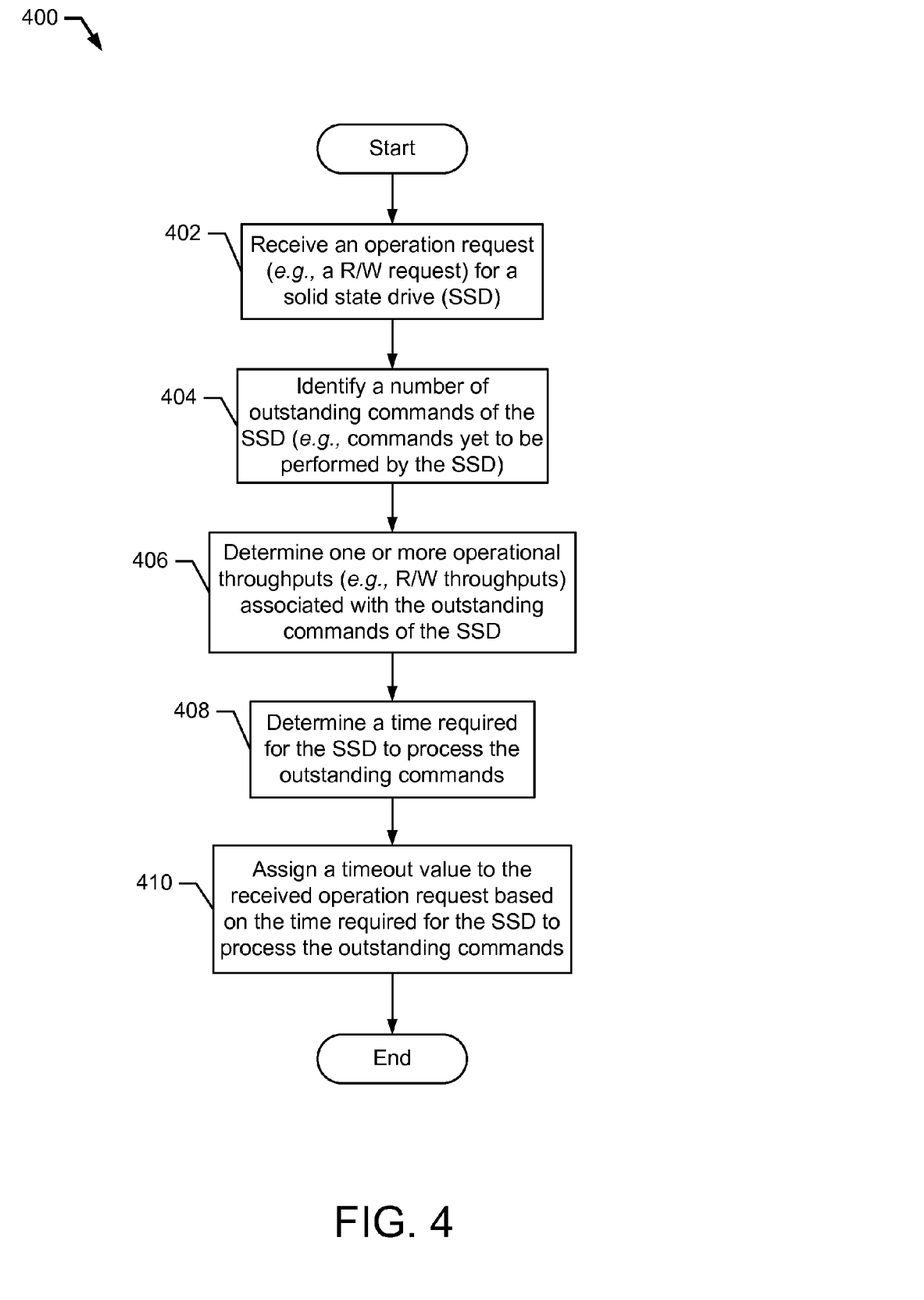
FIG. 4 shows a flowchart depicting an exemplary procedure for assigning a timeout value to a received operation request, based on a time required for an SSD to process outstanding IO commands, in accordance with some embodiments of the disclosure.

FIG. 4 shows a flowchart depicting an exemplary procedure 400 for assigning a timeout value to a received operation request, based on a time required for an SSD to process outstanding IO commands, in accordance with some embodiments of the disclosure. In this regard, it should be understood that any or all of the procedures 400 depicted in FIG. 4 may be associated with a method, or methods, that can be implemented by the execution of computer program instructions stored in a non-transitory computer-readable storage medium of the computing device's 100 storage system 108. The execution of these program instructions can be performed by the processor(s) 104 of the processing circuitry 102 and/or processors of the controller 112, in accordance with varying embodiments of the disclosure.

Initially, at operation block 402, an operation request (e.g., a read or write operation request) for an SSD may be received at a storage system. Next, at operation block 404, a number of outstanding commands of the SSD (e.g., commands yet to be performed by the SSD) may be identified (e.g., by an SSD driver). Thereafter, at operation block 406, one or more operational throughputs (e.g., assumed best case scenario or worst case scenario throughputs for the SSD) associated with the outstanding commands of the SSD can be determined (e.g., by an SSD driver). In some embodiments, the one or more operational throughputs can be associated with theoretical (unthrottled) read and/or write throughputs. Alternatively, the one or more operational throughputs may be associated with actual (throttled) read and/or write throughputs.

Then, at operation block 408, a time required for the SSD to process the outstanding commands can be determined, e.g., as described above for FIG. 3a. Subsequently, at operation block 410, the determined timeout value can be assigned to the received operation request, based in part on the time required for the SSD to process the outstanding commands.

Figure 5:
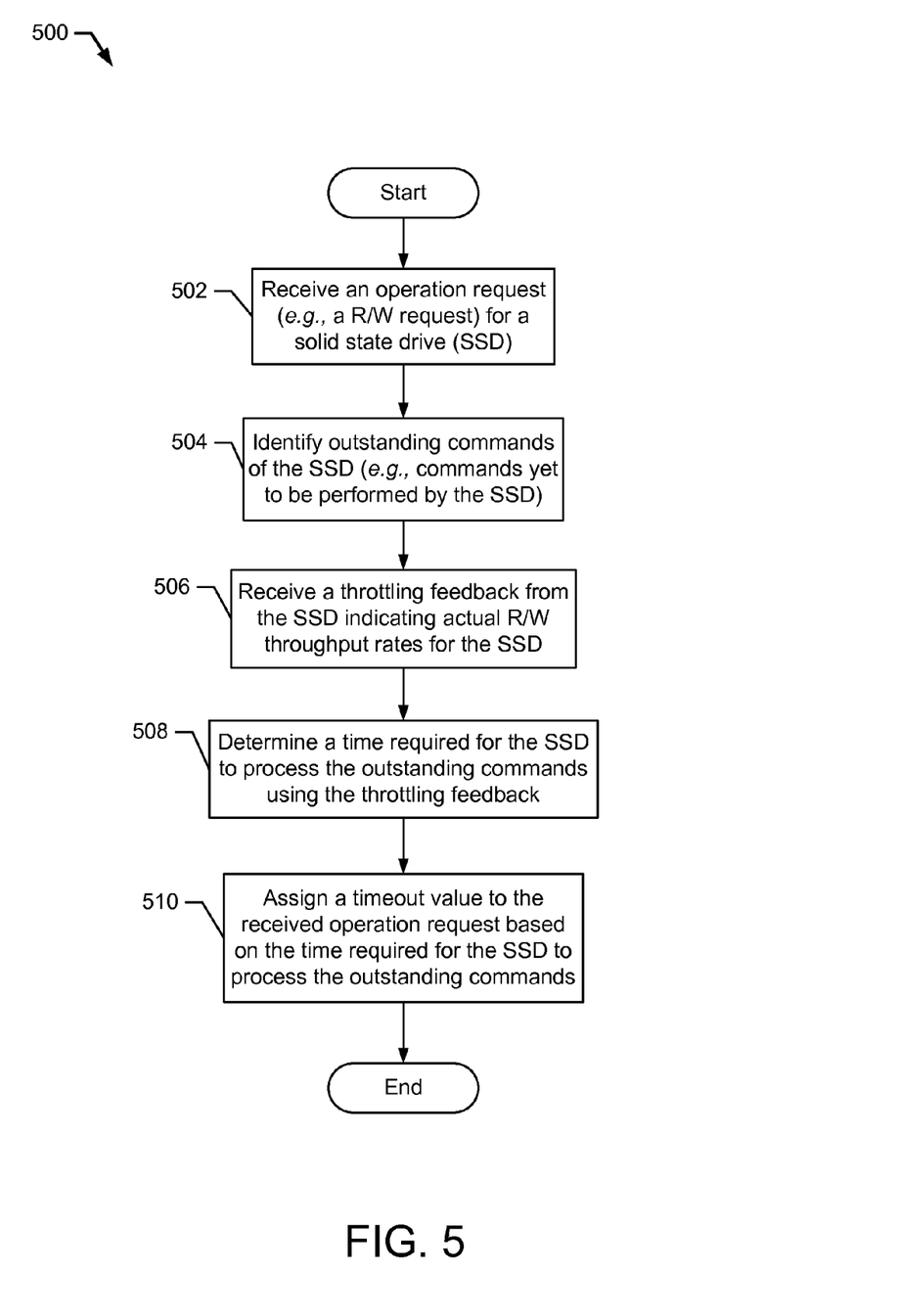
FIG. 5 shows a flowchart depicting an exemplary procedure for assigning a timeout value to a received operation request, based on throttling feedback information received from an SSD, in accordance with various implementations of the disclosure.

FIG. 5 shows a flowchart depicting an exemplary procedure 500 for assigning a timeout value to a received operation request, based on throttling feedback information received from an SSD, in accordance with various implementations of the disclosure. In this regard, it should be understood that any or all of the procedures 500 depicted in FIG. 5 may be associated with a method, or methods, that can be implemented by the execution of computer program instructions stored in a non-transitory computer-readable storage medium of the computing device's 100 storage system 108. The execution of these program instructions can be performed by the processor(s) 104 of the processing circuitry 102 and/or processors of the controller 112, in accordance with varying embodiments of the disclosure.

Initially, at operation block 502, an operation request (e.g., a read or write operation request) for an SSD may be received at a storage system. Next, at operation block 504, a number of outstanding commands of the SSD (e.g., commands yet to be performed by the SSD) may be identified (e.g., by an SSD driver). Thereafter, at operation block 506, a throttling feedback can be received from the SSD, indicating an actual (e.g., throttled) read throughput rate and an actual write throughput rate experienced by the SSD, as well as a current number of active LUN dies of the SSD. Then, at operation block 508, a time required for the SSD to process the outstanding commands can be determined using the received throttling feedback, e.g., as described above for FIG. 3b. Subsequently, at operation block 510, the determined timeout value can be assigned to the received operation request, based in part on a time required for the SSD to process the outstanding commands.

The various aspects, embodiments, implementations or features of the described embodiments can be used separately or in any combination. Further, some aspects of the described embodiments may be implemented by software, hardware, or a combination of hardware and software. The described embodiments can also be embodied as computer program code stored on a non-transitory computer-readable medium. The computer readable-medium may be associated with any data storage device that can store data which can thereafter be read by a computer or a computer system. Examples of the computer-readable medium include read-only memory, random-access memory, CD-ROMs, Solid-State Disks (SSD or Flash), HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A method for managing a solid state drive (SSD), the method comprising:
    receiving an operation request associated with the SSD;
    determining at least one operational throughput based on:
    a number of outstanding commands associated with the SSD, and
    throttling feedback associated with the SSD, wherein the throttling feedback indicates (i) actual input-output (IO) throughput rates of the SSD, and (ii) a number of active logical units (LUNs) of the SSD;
    determining a time for the SSD to process the outstanding commands based at least in part on the at least one operational throughput;
    assigning a timeout value to the operation request, wherein the timeout value corresponds to the time for the SSD to process the outstanding commands;
    issuing at least one command associated with the operation request to the SSD;
    monitoring a time duration for the SSD to process the at least one command; and
    in response to determining that the time duration satisfies the timeout value:
    reissuing the at least one command to the SSD.

2. The method of claim 1, wherein the operation request is:
    i. an IO request for writing application data to the SSD; or
    ii. an IO request for reading application data from the SSD.

3. The method of claim 1, wherein the outstanding commands represent a number of outstanding read commands to be performed by the SSD and/or a number of outstanding write commands to be performed by the SSD.

4. The method of claim 1, wherein the at least one operational throughput corresponds to a first SSD throughput for performing at least one read command of the outstanding commands or a second SSD throughput for performing at least one write command of the outstanding commands.

5. The method of claim 4, wherein:
    the first SSD throughput is a maximum read throughput rate at which data is read from the SSD or a minimum read throughput rate at which data is read from the SSD under a throttled throughput condition; and
    the second SSD throughput is a maximum write throughput rate at which data is written to the SSD or a minimum write throughput rate at which data is written to the SSD under the throttled throughput condition.

6. The method of claim 4, wherein the first SSD throughput and/or the second SSD throughput is associated with a throttled throughput rate that is throttled based at least in part on:
    i) a die temperature of the LUNs of the SSD exceeding an operating temperature threshold of the SSD; or
    ii) an ambient temperature that affects the LUNs of the SSD exceeding an ambient temperature threshold of the SSD.

7. The method of claim 1, wherein:
    increasing an amount of power provided to the SSD causes an increase in the number of active LUNs of the SSD; and
    decreasing the amount of power provided to the SSD causes a decrease in the number of active LUNs of the SSD.

8. The method of claim 1, wherein determining the time for the SSD to process the outstanding commands further comprises:
    dividing a first data requirement of a first portion of the outstanding commands by a first operational throughput value to obtain a first result;
    dividing a second data requirement of a second portion of the outstanding commands by a second operational throughput value to obtain a second result;
    summing the first result and the second result to obtain a third result; and
    multiplying the third result by the number of active LUNs of the SSD to determine the time for the SSD to process the outstanding commands.

9. At least one non-transitory computer readable storage medium configured to store instructions that, when executed by at least one processor included in a computing device, cause the computing device to carry out steps that include:
    receiving an operation request associated with a solid state drive (SSD) communicably coupled to the computing device;
    determining at least one operational throughput based on:
    a number of outstanding commands associated with the SSD, and
    throttling feedback associated with the SSD, wherein the throttling feedback indicates (i) actual input-output (IO) throughput rates of the SSD, and (ii) a number of active logical units (LUNs) of the SSD;

determining a time for the SSD to process the outstanding commands based at least in part on the at least one operational throughput;

assigning a timeout value to the operation request, wherein the timeout value corresponds to the time for the SSD to process the outstanding commands;

issuing at least one command associated with the operation request to the SSD;

monitoring a time duration for the SSD to process the at least one command; and in response to determining that the time duration satisfies the timeout value:

reissuing the at least one command to the SSD.

10. The at least one non-transitory computer readable storage medium of claim 9, wherein:

increasing an amount of power provided to the SSD causes an increase in the number of active LUNs of the SSD; and decreasing the amount of power provided to the SSD causes a decrease in the number of active LUNs of the SSD.

11. The at least one non-transitory computer readable storage medium of claim 9, wherein determining the time for the SSD to process the outstanding commands further comprises:

dividing a first data requirement of a first portion of the outstanding commands by a first operational throughput value to obtain a first result;

dividing a second data requirement of a second portion of the outstanding commands by a second operational throughput value to obtain a second result;

summing the first result and the second result to obtain a third result; and multiplying the third result by the number of active LUNs of the SSD to determine the time for the SSD to process the outstanding commands.

12. A storage system, comprising:

an input-output (IO) component;

a solid state drive (SSD) having logical units (LUNs); and a controller that is coupled to the IO component and the SSD, wherein the controller is configured to cause the storage system to:

receive an operation request associated with the SSD;

determine at least one operational throughput based on:

a number of outstanding commands associated with the SSD, and throttling feedback associated with the SSD, wherein the throttling feedback indicates (i) actual input-output (IO) throughput rates of the SSD, and (ii) a number of the LUNs of the SSD;

determine a time for the SSD to process the outstanding commands based at least in part on the at least one operational throughput;

assign a timeout value to the operation request, wherein the timeout value corresponds to the time for the SSD to process the outstanding commands;

issue at least one command associated with the operation request to the SSD;

monitor a time duration for the SSD to process the at least one command; and in response to determining that the time duration satisfies the timeout value:

reissue the al least one command to the SSD.

13. The storage system of claim 12, wherein the operation request is:

i. an IO request for writing application data to the SSD; or ii. an IO request for reading application data from the SSD.

14. The storage system of claim 12, wherein the at least one operational throughput corresponds to a first SSD throughput for performing at least one read command of the outstanding commands or a second SSD throughput for performing at least one write command of the outstanding commands.

15. The storage system of claim 14, wherein:

the first SSD throughput is a maximum read throughput rate at which data is read from the SSD or a minimum read throughput rate at which data is read from the SSD under a throttled throughput condition; and the second SSD throughput is a maximum write throughput rate at which data is written to the SSD or a minimum write throughput rate at which data is written to the SSD under the throttled throughput condition.

16. The storage system of claim 14, wherein the first SSD throughput and/or the second SSD throughput is associated with a throttled throughput rate that is throttled based at least in part on:

i) a die temperature of the LUNs of the SSD exceeding an operating temperature threshold of the SSD; or ii) an ambient temperature that affects the LUNs of the SSD exceeding an ambient temperature threshold of the SSD.

17. The storage system of claim 12, wherein determining the time for the SSD to process the outstanding commands further comprises:

dividing a first data requirement of a first portion of the outstanding commands by a first operational throughput value to obtain a first result;

dividing a second data requirement of a second portion of the outstanding commands by a second operational throughput value to obtain a second result;

summing the first result and the second result to obtain a third result; and multiplying the third result by the number of active LUNs of the SSD to determine the time for the SSD to process the outstanding commands.

* * * * *